(12) United States Patent
Weber et al.

(10) Patent No.: US 8,961,168 B2
(45) Date of Patent: Feb. 24, 2015

(54) DEVICE FOR TRANSFERRING HEAT AND A RELATED MEANS OF TRIGGERING A CONTROLLED COMBUSTION

(75) Inventors: Lawrence Weber, Holbrook, NY (US); Giampaolo Vacca, Mason, OH (US); Jeff Poston, Loveland, OH (US); Pavlo Bagriy, Loveland, OH (US)

(73) Assignee: Global Heating Technologies, GmbH, Baar (CH)

( * ) Notice: Subject to any disclaimer, the term of this patent is extended or adjusted under 35 U.S.C. 154(b) by 640 days.

(21) Appl. No.: 13/026,848

(22) Filed: Feb. 14, 2011

(65) Prior Publication Data

US 2011/0197873 A1 Aug. 18, 2011

Related U.S. Application Data

(60) Provisional application No. 61/304,704, filed on Feb. 15, 2010.

(51) Int. Cl.
| | | |
|---|---|---|
| *F23Q 11/00* | (2006.01) | |
| *B01J 8/00* | (2006.01) | |
| *C01B 3/06* | (2006.01) | |
| *C01B 3/50* | (2006.01) | |
| *F24J 1/00* | (2006.01) | |

(52) U.S. Cl.
CPC ............... *C01B 3/065* (2013.01); *C01B 3/501* (2013.01); *F24J 1/00* (2013.01); *C01B 2203/0405* (2013.01); *C01B 2203/041* (2013.01); *Y02E 60/362* (2013.01)
USPC ............... 431/2; 422/165; 423/657; 431/268

(58) Field of Classification Search
USPC ............... 423/644, 657; 422/165; 431/2, 268
See application file for complete search history.

(56) References Cited

U.S. PATENT DOCUMENTS

| | | |
|---|---|---|
| 2003/0194363 A1 | 10/2003 | Koripella et al. |
| 2004/0209206 A1 * | 10/2004 | Hockaday et al. ............... 431/2 |
| 2006/0117659 A1 | 6/2006 | McLean |
| 2006/0222911 A1 * | 10/2006 | Ord et al. ............... 429/19 |
| 2007/0042247 A1 * | 2/2007 | Baird et al. ............... 429/24 |
| 2007/0259220 A1 * | 11/2007 | Redmond ............... 429/12 |
| 2008/0016767 A1 * | 1/2008 | Brantley et al. ............... 48/61 |
| 2008/0026267 A1 * | 1/2008 | Rikihisa et al. ............... 429/17 |
| 2009/0060833 A1 * | 3/2009 | Curello et al. ............... 423/658.2 |
| 2009/0119989 A1 * | 5/2009 | Withers-Kirby et al. ......... 48/61 |
| 2009/0274615 A1 | 11/2009 | Janker et al. |
| 2009/0297435 A1 | 12/2009 | Holladay et al. |
| 2010/0055518 A1 | 3/2010 | Chen et al. |
| 2010/0192937 A1 | 8/2010 | Vacca et al. |
| 2010/0316916 A1 | 12/2010 | Takeguchi et al. |

OTHER PUBLICATIONS

International Search Report and Written Opinion mailed Jun. 16, 2011 for PCT Application No. PCT/US2011/024920.

* cited by examiner

*Primary Examiner* — Stanley Silverman
*Assistant Examiner* — Syed Iqbal (57) ABSTRACT

The present invention is a means of starting a controlled combustion reaction by introducing sodium borohydride or similar chemical to a liquid or gelatinous fuel. The present invention is also a device for transferring heat having a thermal conductor connected to a catalyst such that the thermal conductor is positioned within a liquid or gelatinous fuel held within a fuel container.

31 Claims, 11 Drawing Sheets

DEVICE FOR TRANSFERRING HEAT AND A RELATED MEANS OF TRIGGERING A CONTROLLED COMBUSTION

CROSS-REFERENCE TO RELATED APPLICATION

The present application claims priority to U.S. provisional Patent Application No. 61/304,704 as filed Feb. 15, 2010.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to a means of triggering a controlled combustion within a container, and also a device for transferring heat.

2. Description of the Related Art

A chemical reaction resulting from mixing water or methanol (or other hydrogen-bearing fuel) with sodium borohydride (or other hydride) includes a release of hydrogen gas and heat. Such reaction can be accelerated or moderated by the presence of certain catalysts, including, for example, metals such as nickel, cobalt, Raney nickel, certain pigments, and other materials.

Hydrogen produced from such chemical reaction can be used in the presence of air to purge a surface of a flameless catalytic combustor of hydrogen bearing fuels, for example, fuels such as methanol or ethanol. As such, the hydrogen may aid in a passive self-start of flameless combustion in the presence of such fuels and air of a flameless catalytic combustor.

It is known that an alcohol fueled flameless catalytic heater is most efficient when the fuel, in the form of a vapor, reaches the catalyst at the same time as oxygen reaches the catalyst. This is true of almost all combustion reactions of liquid fuels, as it is the vapor that combusts.

The heat released by an exothermic chemical reaction, an exemplary reaction being mixing sodium borohydride with methanol, will heat the methanol and therein aid in the methanol's vaporization. Vaporization of a fuel such as methanol can be of particular assistance when the fuel is relatively cold, such as in winter seasons or arctic regions. Depending on various factors, the heat released could be sufficient to cause a small amount of fuel actually to boil and thereby produce vaporized fuel quite rapidly.

The heat released by an electric heating element can warm a liquid fuel or a gel fuel. This can be of particular assistance when the fuel is cold, such as in the winter season or arctic regions. Like above, depending on various factors, the heat released could be sufficient to cause a small amount of fuel actually to boil and thereby produce vaporized fuel quite rapidly.

Storage and transportation of alcohol-based fuels is less dangerous when the alcohol-based fuel is transported in the form of a gel. However, since the fuel is a gel, the alcohol's vapor pressure is much lower than when it is in its liquid form. Essentially, this means that the fuel is not as easily used as a fuel in flameless catalytic heaters, as well as other applications, including, for example, direct methanol fuel cells. If, however, the fuel in the form of gel could be re-liquified when desired, there could be advantages in the increased applications in which the alcohol-base fuel could be used.

A gelled alcohol, e.g. in a fuel can, can be combined with sodium borohydride or other similar alkali metal hydride to cause the alcohol-based gel to re-liquefy and the mixture to release hydrogen gas. In addition, heat will be released in such exothermic chemical reaction.

In applications and equipment designs where a liquid form of alcohol-based fuel is preferred, the re-liquefaction of gelled fuel is advantageous both in fuel logistics and for performance. In some applications, such as a flameless catalytic heater, it is possible to thermally attach the heater to a fuel container. In thermally attaching the heater to the fuel container, it may be advantageous to use a thermal conductor from the heater to the fuel in order to heat the fuel to produce a fuel vapor. However, in some applications this may not be practical or possible. In the circumstances in which it is not practical or possible to use a thermal conductor from the heater to the fuel, sodium borohydride or similar chemical can be introduced to re-liquefy and begin heating the fuel. The introduction of the sodium borohydride or similar chemical can be conducted in the fuel storage container or a separate liquefying chamber, thereby enabling the liquefied fuel to flow through tubing and the like to reach the point of its use.

Catalysts such as platinum, palladium, etc. are known to become inert over time. A vapor of methanol fuel which can readily self start its flameless catalytic combustion on a particular catalyst in air may encounter difficulty self starting on the very same catalyst a few months later. The particular causes of catalysts becoming inert are not all known. However, a catalyst that has become inert with time can be "re-activated" by hydrogen self-ignition. The hydrogen for re-activating a catalyst can come from one or more sources, including, for example, a tank or a bladder which releases the hydrogen toward the catalyst prior to or simultaneously with the main fuel. Alternatively, the hydrogen can be chemically or electrolytically produced. Chemical production of hydrogen can be accomplished, for example, via the reaction of sodium borohydride with water, methanol, and/or other hydrogen bearing liquids.

Thus, what is desired is a means for starting a controlled combustion and a means of transferring heat created from controlled combustions.

SUMMARY

Various exemplary embodiments of the present invention include a method for triggering a controlled combustion. The method includes the steps of containing a hydrogen-bearing fuel within a container, and introducing sodium borohydride to the hydrogen-bearing fuel within the container such that hydrogen and heat are released.

Other exemplary embodiments of the present invention include device for transferring heat. The device is comprised of a fuel container, fuel in the fuel container, potentially a chemical initiator, and a thermal conductor in thermal contact with the fuel and a catalyst. The chemical initiator, if used, is introduced to the fuel to produce heat and vaporization of the fuel which must escape through the thermal conductor and catalyst assembly supporting an environment for combustion at or near the catalyst. Heat generated by the combustion may be transferred to the fuel by way of the thermal conductor.

BRIEF DESCRIPTION OF THE DRAWINGS

The various exemplary embodiments of the present invention, which will become more apparent as the description proceeds, are described in the following detailed description in conjunction with the accompanying drawings, in which.

DESCRIPTION OF THE REFERENCED NUMERALS

In reference to the drawings, similar reference characters denote similar elements throughout all the drawings. The following is a list of the reference characters and associated element:

1 Thermal conductor
2 Fuel container
3 Fuel vapor
4 Chemical (hydride) container
5 Liquid or gel fuel
6 Membrane or porous media
7 Catalyst
8 Chemical (hydride)
9 External chamber
10 Fuel line
11 Compression spring
12 Valve
13 Fuel soluble container
14 Male threads
15 Female threads
16 Thermally activated spring
17 Modified thermal conductor
18 Adjustable porous material
19 Handle
20 Electric heater
21 Wire
22 Compressed hydrogen gas tank
23 Compressed hydrogen gas
24 Piercing means

DETAILED DESCRIPTION

Figure 1:
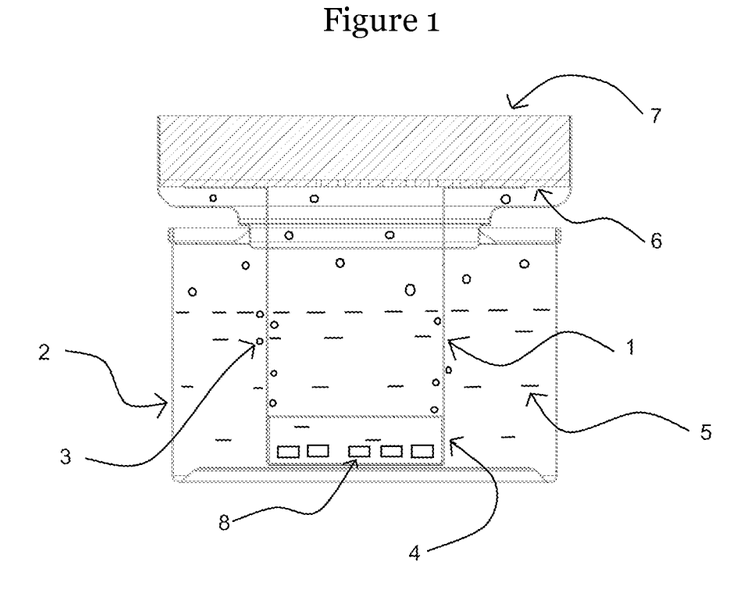
FIG. 1 is an illustration of a device according to an exemplary embodiment of the present invention.

The present invention relates to a device for transferring heat. The device includes a thermal conductor 1 and a fuel container 2. The thermal conductor transfers heat from a hot catalyst 7 (or other heated item, such as a fuel cell or internal combustion engine, etc.) to fuel within the fuel container 2 or other fuel distribution system; an exemplary embodiment of which is illustrated in FIG. 1. The exemplary embodiment of FIG. 1 also illustrates that the thermal conductor 1 can house a chemical 8 in a chemical container 4 which may be attached to or part of the thermal conductor.

The fuel in the container may be in liquid or gel form, and may include any hydrogen-bearing fuel such as, for example, isopropanol, butanol, methanol, ethanol, or as a gas such as syngas, etc.

In FIG. 1, the liquid or gel fuel 5 is stored in a fuel container 2. Hydrogen gas is released as a fuel vapor 3 when a chemical (hydride) 8 is introduced to the liquid or gel fuel. The chemical may be, for example, sodium borohydride, contained within a porous container that allows the fuel and chemical to mix, and react to produce heat and some vaporization/boiling of the fuel. The fuel vapor then feeds, for example, a catalytic heater. The fuel container is preferably sealed such that the fuel vapor must escape through a catalyst 7 after which fresh air contacts the fuel vapor at or near the catalyst, thereby supporting an environment for combustion. In exemplary embodiments, the fuel vapor may escape through the thermal conductor prior to escape through and reaction at the catalyst.

In the embodiments in which the fuel is a gel, a chemical such as sodium borohydride may be introduced to the gel in order to liquefy the fuel or release hydrogen gas from the reaction between the sodium borohydride and water, fuel, or a mixture of the latter.

It should be noted that the thermal conductor may be a dedicated component or it may be multifunctional. The thermal conductor may be repositioned or modified to adjust a fuel heating rate, adjust the rate of fuel vaporization, adjust a rate of fuel vapor reaching the catalyst, control a rate of heat output (temperature), and the like.

The catalyst may be in the form of, for example, platinum, palladium, etc. The catalyst may be restored to reactivity with the primary fuel by its contact in air with hydrogen released from the fuel container or otherwise. The combustion of the hydrogen heats the catalyst to thereby assist in the start of the combustion of the primary fuel.

Heat from the combustion of the hydrogen, and/or the main fuel on the catalyst is transferred via the thermal conductor to the fuel to create a sustained vaporization of the fuel.

Figure 3:
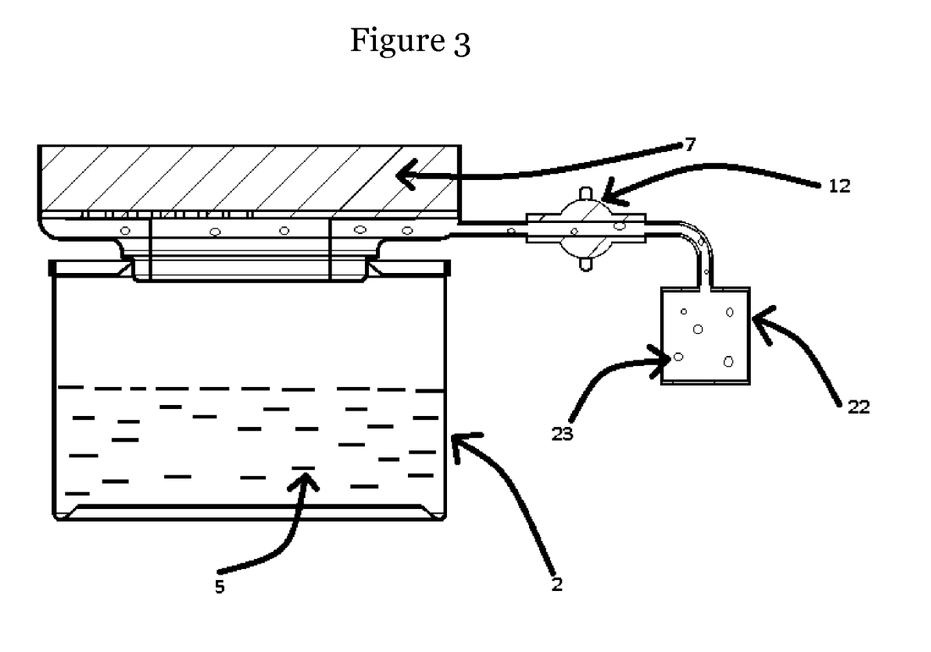
FIG. 3 is an illustration of a device according to an exemplary embodiment of the present invention in which compressed hydrogen gas is stored and used to reactivate a catalyst.
Figure 10:
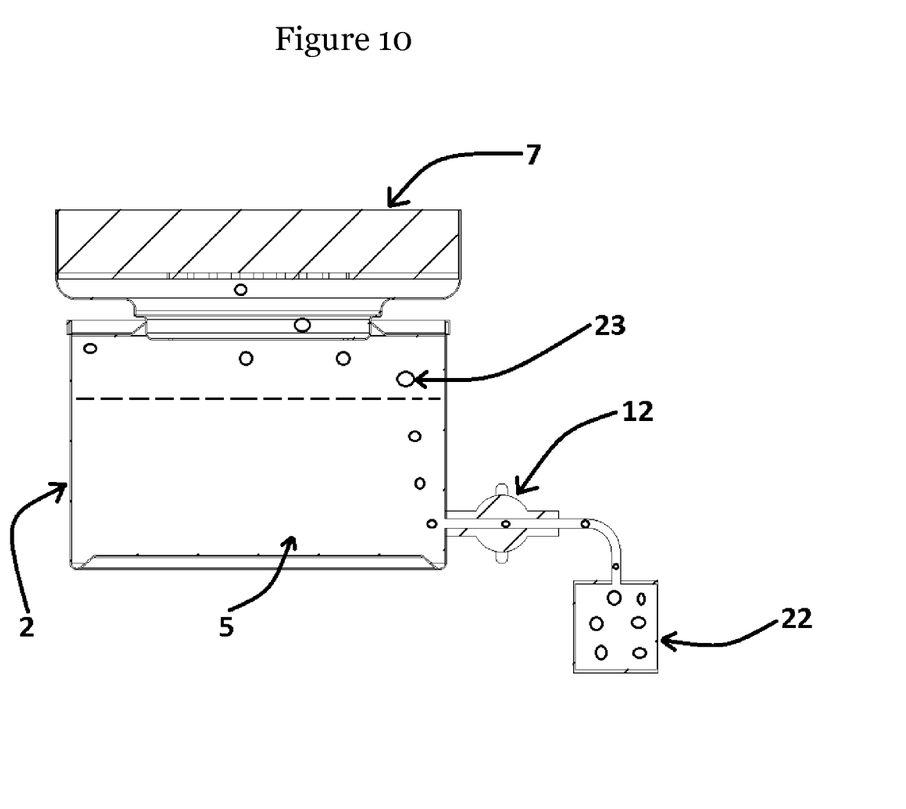
FIG. 10 is an illustration of an exemplary embodiment of the present invention in which hydrogen is bubbled through a fuel.

In an exemplary embodiment illustrated in FIG. 3, compressed hydrogen gas 23 is stored in a compressed hydrogen gas tank 22 until a valve 12 is opened to release the compressed hydrogen gas 23 to allow the hydrogen to reactivate and trigger combustion on the catalyst. Although FIG. 3 illustrates the hydrogen to flow directly to the catalyst, the hydrogen may alternatively or additionally be bubbled through the fuel as illustrated in FIG. 10.

Repositioning the thermal conductor relative to the fuel and/or fuel container may be used as a means of adjusting the rate of fuel vaporization and may be performed manually or automatically, using, for example, a bimetallic strip or a solenoid or motor.

The composition and dimensions of the thermal conductor, including a diameter, cross-section, length, materials, coatings, etc. may vary the heating output.

Figure 6:
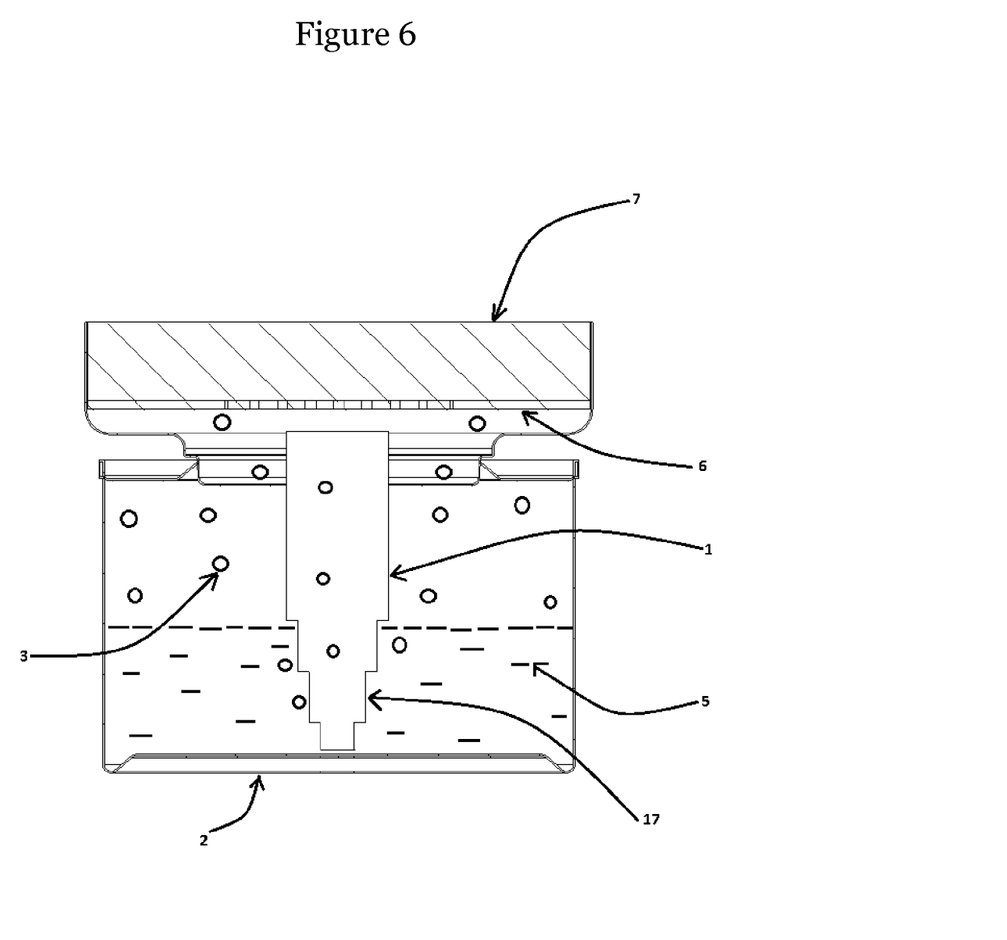
FIG. 6 is an illustration of a device according to an exemplary embodiment of the present invention having a thermal conductor varying in its shape deeper in the fuel.

In addition to the repositioning of the thermal conductor, the amount of heat conducted will depend on the depth (mass) of the fuel in the fuel container. For example, as illustrated in FIG. 6, a thermal conductor may be a modified thermal conductor 17 such that the shape varies the amount of heat transferred into the fuel based on the mass of the fuel remaining.

Figure 4:
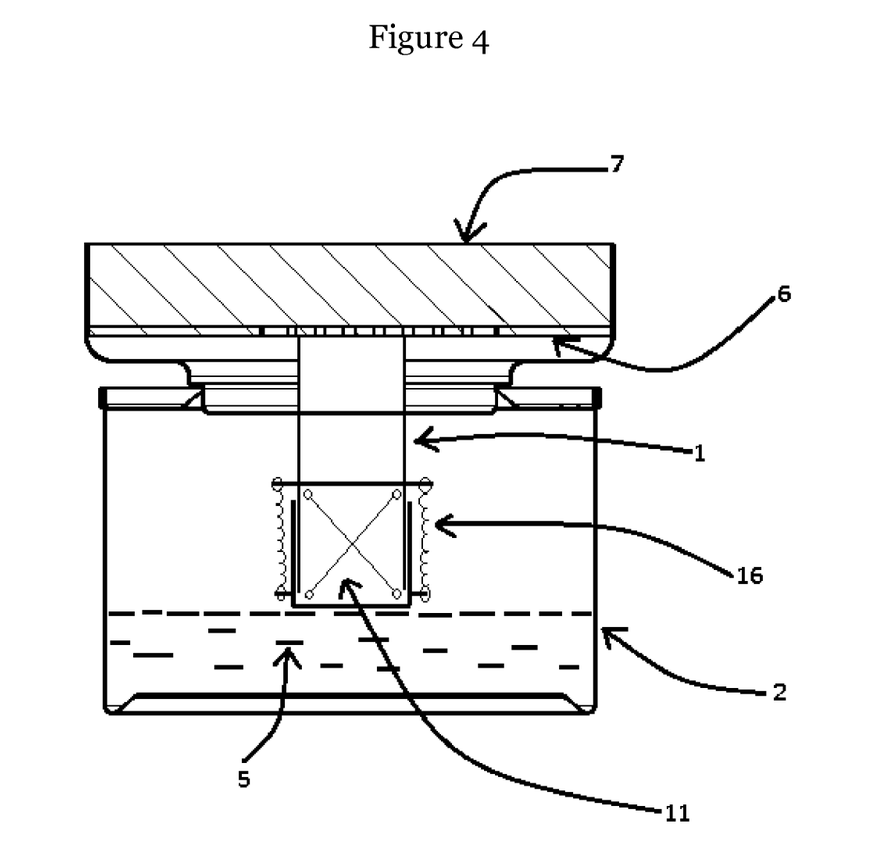
FIG. 4 is an illustration of a device according to an exemplary embodiment of the present invention in which a thermal conductor is positioned in a liquid or gel fuel by a compression spring and thermally activated spring.

FIG. 4 illustrates an exemplary embodiment in which the thermal conductor is positioned within the liquid or gel fuel by one or more compression springs 11 which transfers heat from the catalyst and membrane or porous media to the liquid or gel fuel 5 until the thermally activated springs 16 are heated to a temperature which causes the thermally activated springs to pull a part of the thermal conductor out of, or less deeply into the liquid or gel fuel. Pulling a part of the thermal conductor out of the liquid or gel fuel should reduce the amount of fuel vapor created, thereby reducing the systems/fuel temperature until such time as the thermally activated springs 16 cool to the point that they relax and then allow part of the thermal conductor to be moved deeper into the liquid or gel fuel by the compression spring ii which will increase the amount of heat transferred into the liquid or gel fuel thereby increasing the amount of fuel vapor produced and increasing the temperature output of the heater. This will regulate the temperature of the heater to the approximate temperature at which the thermally activated springs react.

Figure 8:
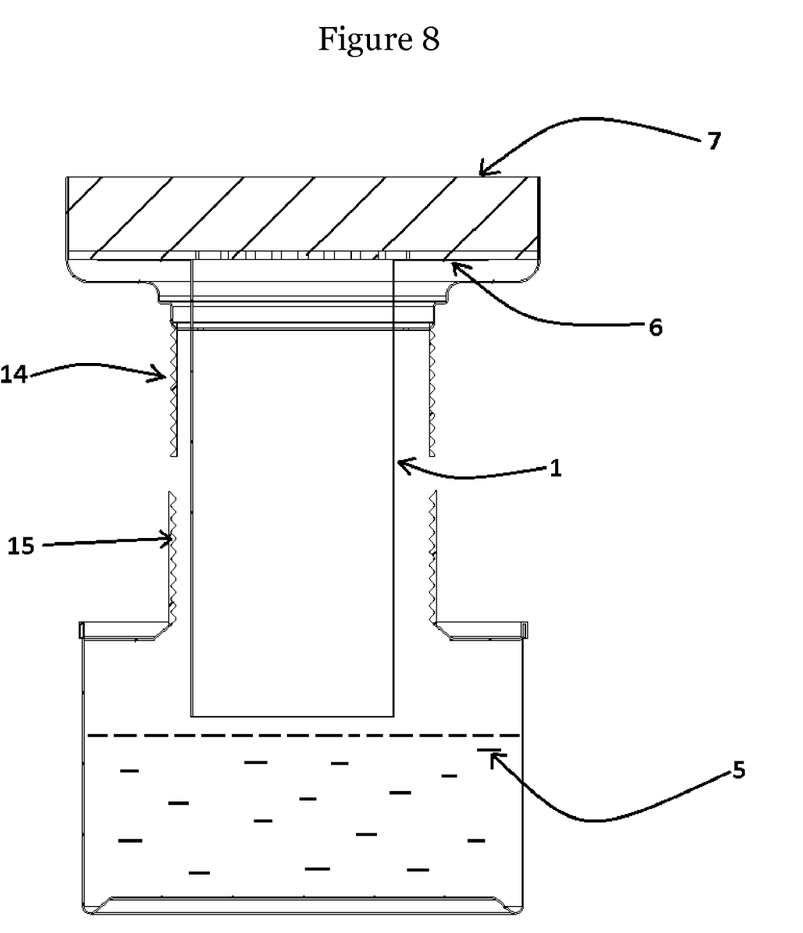
FIG. 8 is an illustration of an exemplary embodiment of the present invention having a means for manually adjusting the depth of the thermal conductor within the fuel.

The positioning of the thermal conductor relative to the liquid or gel fuel can also be adjusted manually or automatically via an interaction between male threads 14 and female threads 15 as illustrated in FIG. 8.

Figure 7:
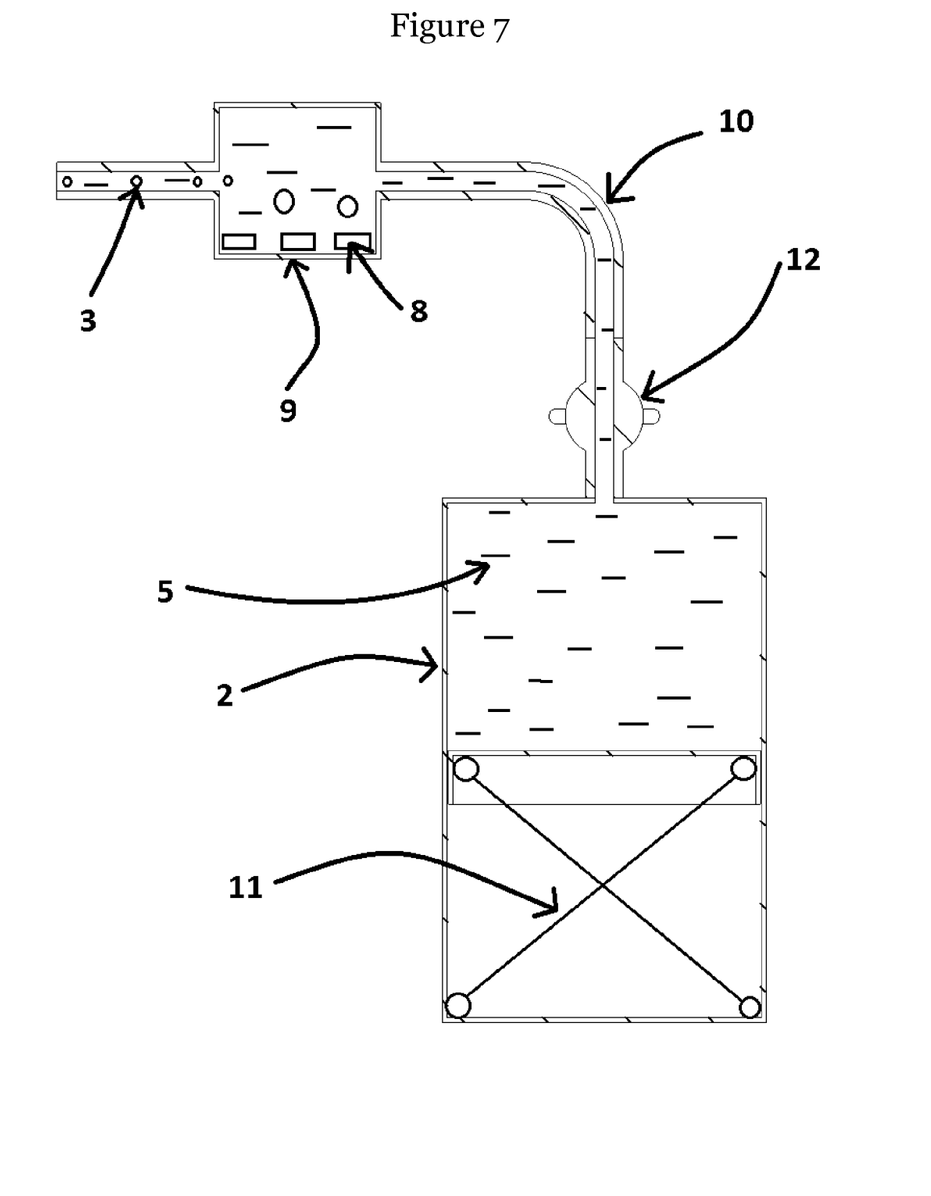
FIG. 7 is an illustration of an exemplary embodiment of the present invention in which liquid fuel is pressurized by a compression spring in a fuel container and the fuel interacts with the hydride chemical separately from the fuel storage tank.

In the exemplary embodiment illustrated in FIG. 7, the liquid fuel is pressurized by one or more compression springs in the fuel container. When released by a valve opening, the liquid fuel travels through fuel line 10 to an external chamber for chemical reaction 9 in which is a chemical 8 which reacts with the liquid fuel to produce a hydrogen gas-fuel vapor mixture 3 and heat, all of which assists in vaporizing fuel 5.

In exemplary embodiments, a membrane or layer comprised by porous media 6 is positioned between the catalyst and the fuel vapor. The membrane can restrict fuel flow, thereby varying the heat output (temperature). The membrane may be adjusted manually or automatically by way of, for example, a bimetallic strip or solenoid or motor.

Figure 5:
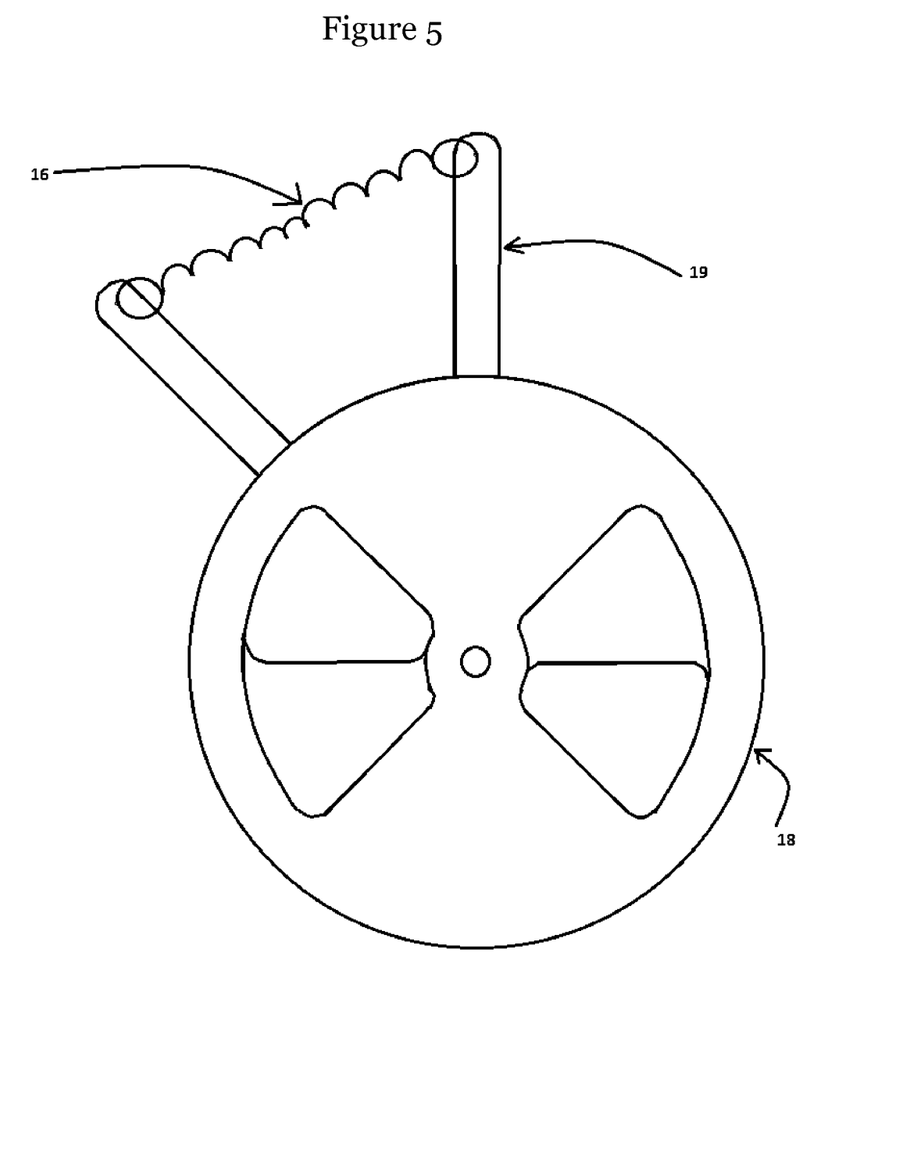
FIG. 5 is an illustration of an adjustable membrane or porous medium for use with an exemplary embodiment of the present invention.

FIG. 5 illustrates an exemplary embodiment of the porous media in which the porous medium is comprised by two plates with matching holes 18. One of the two plates is preferably fixed and the other plate may be rotated such that an opening between the two matching holes is increased or decreased. Changing the opening alters the amount of fuel that can pass through, thereby changing the heat output (and temperature). Such changing the opening can be done manually or automatically.

The membrane or porous media preferably evenly distributes the vaporized fuel on the catalyst and regulates the rate at which the vaporized fuel reaches the catalyst.

Figure 2:
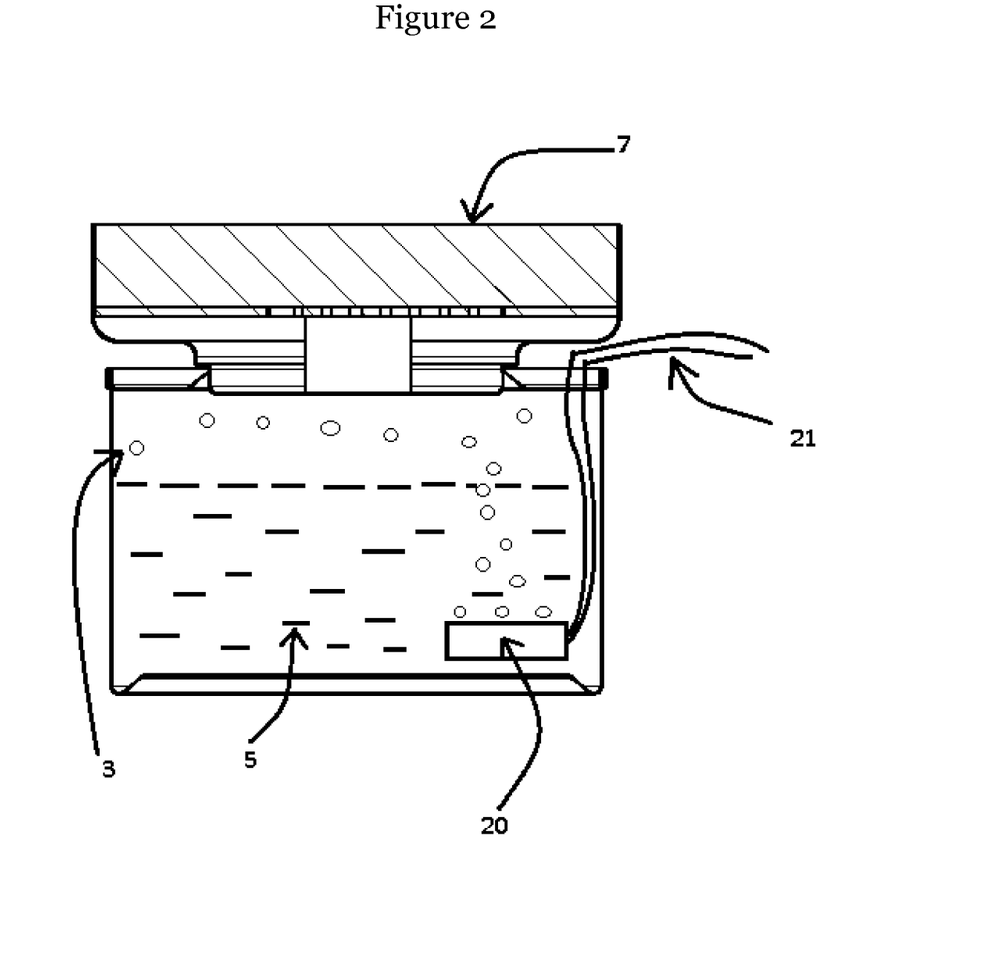
FIG. 2 is an illustration of a device according to an exemplary embodiment of the present invention which an electric heater is inside a fuel container.

An electric heater 20 may be used to aid or create vaporization of the liquid fuel or gel fuel for combustion. See FIG. 2. The fuel can be heated in its fuel container via the electric heater positioned inside the fuel container, or an electric heater could be placed outside the fuel container heating through the fuel container. The electric heater could also be placed at any other point in the fueling system so that the fuel is heated as it passes through the fueling system. For example a pipe in which the fuel passes could have an electric heater around, beside, or inside the pipe that heats the fuel as it passes. Depending on the application this heating can be such that it actually raises the temperature of the fuel to the boiling point and vaporizes some or all of the fuel, or it can merely raise the temperature closer to the vaporization point to allow it to more readily vaporize in the fuel container.

The electric heater may be thermostatically controlled or temperature controlled based either directly upon the temperature of a portion of the device or based upon the temperature of the areas or item that the device is heater. This allows a varying temperature output of the device. The heat output of the electric heater may be varied, in various exemplary embodiments, may be controlled via a voltage or current regulation means, or a pulse width modulation.

In other exemplary embodiments, an exothermic chemical reaction may heat the fuel to assist in the vaporization of the liquid fuel or gel fuel for combustion. The fuel can be heated in the fuel container via an exothermic chemical reaction inside the fuel container or an exothermic chemical reaction can occur outside the fuel container heating the fuel through the fuel container. This exothermic chemical reaction can have the fuel as one of its reactants, though it could also be achieved without using the fuel as a reactant. For example, magnesium can be combined with aqueous saline to produce heat, which could be used to heat the fuel. The exothermic chemical reaction could also be placed at any other point in the fueling system so that the fuel is heated as it passes through the fueling system. For example a pipe in which the fuel passes could have a chamber in which an exothermic chemical reaction occurs around, beside, or inside the pipe which heats the fuel as it passes. Depending on the application this heating can be such that it actually raises the temperature of the fuel to the boiling point and vaporizes some or all of the fuel, or it can merely raise the temperature closer to the vaporization point to allow it to more readily vaporize in the heater.

Figure 9:
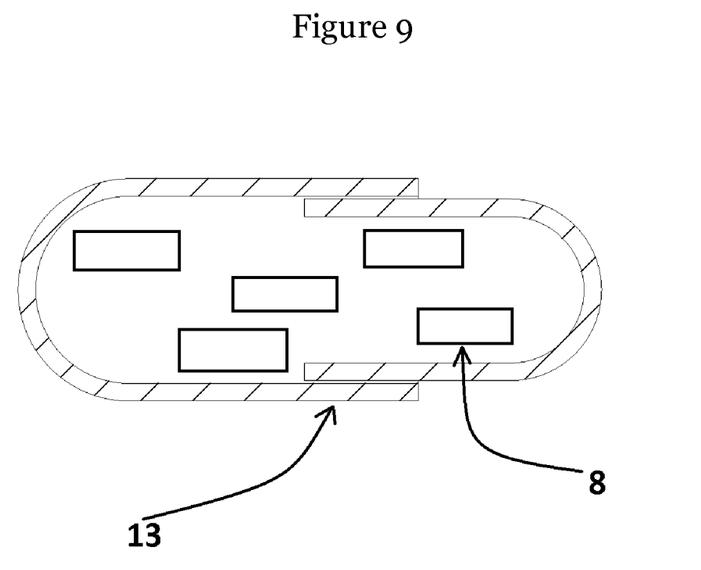
FIG. 9 is an illustration of an exemplary embodiment of the present invention in which a chemical is stored inside a fuel soluble container.

FIG. 9 illustrates an embodiment in which the chemical 8 is stored inside of a fuel soluble container 13, which can then be introduced to the liquid or gel fuel to assist in the combustion process.

Figure 11:
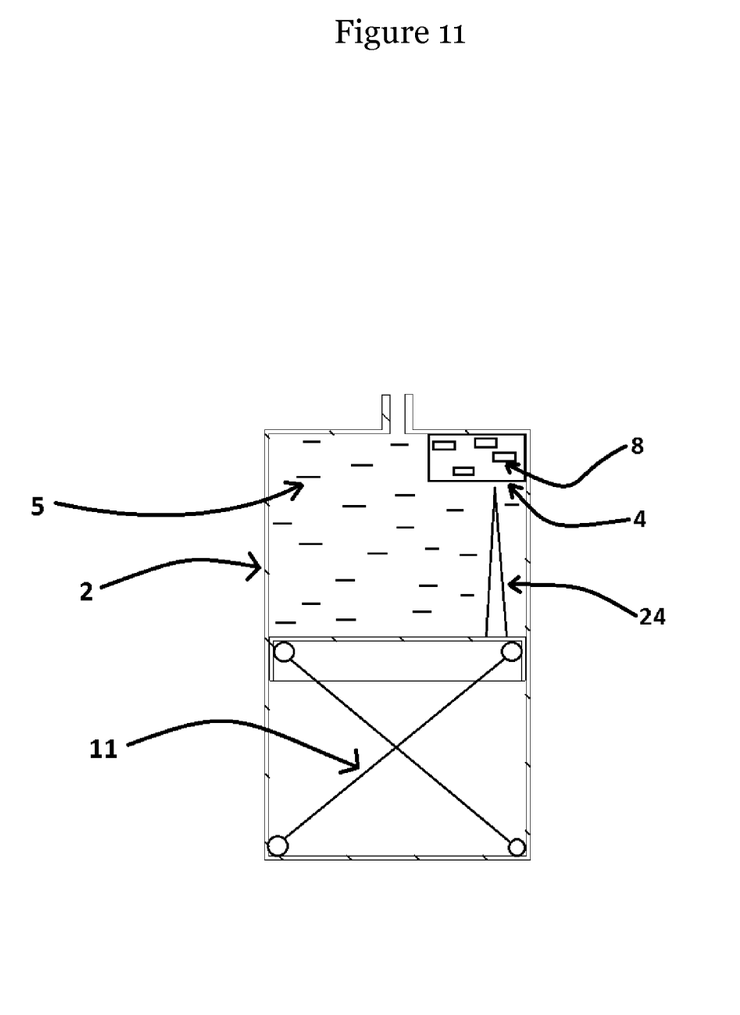
FIG. 11 is an illustration of an exemplary embodiment of the present invention in which a chemical is separated from fuel until released via a piercing means.

FIG. 11 is a variation on the embodiment illustrated in FIG. 9. In FIG. 11, the chemical 8 is stored within a chemical container 4, which may be a bladder-like material. One or more piercing means 24 may be activated manually or automatically to drive into the chemical container to release the chemical 8 from the chemical container and then react with the fuel 5 surrounding an outside of the chemical container. The one or more piercing means may be directed towards the chemical container via, for example, compression springs 11 or other piston or piston-like means.

In another exemplary embodiment, the chemical 8 is stored within a chemical container 4, which may be a bladder-like material. In addition, the fuel 5 may be stored within a fuel container, which may be a bladder-like material. One or more piercing means may then be activated manually or automatically to drive into the chemical container and the fuel container in order to release the chemical and the fuel. respectively. The one or more piercing means may be directed towards the chemical container via, for example, compression springs 11 or other piston or piston-like means.

It should also be noted that in exemplary embodiments, one or more scents and/or animal/insect repellents can be added to the fuel.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

What is claimed is:

1. A method for triggering a controlled combustion of an alcohol-based fuel, the method comprising the steps of:
   containing an alcohol-based primary fuel within a fuel container;
   providing a thermal conductor in thermal contact with the primary fuel;
   providing a catalyst, wherein the catalyst is thermally connected to the thermal conductor and fluidly connected to air; and
   introducing an initiator within the container such that the initiator provides a supply of hydrogen gas;
   wherein the initiator starts a controlled combustion of the primary fuel by:
   (a) combusting the hydrogen gas with air on or near the catalyst; and
   (b) generating heat and vaporization of the primary fuel;
   wherein the fuel container and thermal conductor are configured such that (i) heat generated by the initiator is transferred to the primary fuel and (ii) vaporized primary fuel is delivered to the catalyst; and
   wherein the heat and vaporized primary fuel thereby support an environment for sustained combustion of the primary fuel by the catalyst in the absence of further supply of hydrogen gas from the initiator.

2. The method according to claim 1, wherein the alcohol-based primary fuel is selected from the group consisting of isopropanol, butanol, methanol, ethanol, and combinations thereof.

3. The method according to claim 2, wherein the hydrogen gas restores activity of the catalyst.

4. The method according to claim 3, wherein the initiator is a metal hydride.

5. The method according to claim 4, where the step of introducing the metal hydride is performed by piercing a chemical container within which is stored the metal hydride such that the metal hydride is released from the chemical container and able to react with the primary fuel.

6. A device for transferring heat, the device being comprised of:
   a fuel container;
   an alcohol-based primary fuel in the fuel container;
   an initiator;
   a thermal conductor in thermal contact with the primary fuel; and
   a catalyst, wherein the catalyst is thermally connected to the thermal conductor and fluidly connected to air;
   wherein the initiator provides a supply of hydrogen gas and is capable of initiating a controlled combustion of the primary fuel by:
   (a) combusting the hydrogen gas with air on or near the catalyst; and
   (b) generating heat and vaporization of the primary fuel;
   wherein the fuel container and thermal conductor are configured such that (i) heat generated by the initiator is transferred to the primary fuel and (ii) vaporized primary fuel is delivered to the catalyst; and
   wherein the heat and vaporized primary fuel thereby support an environment for sustained combustion of the primary fuel by the catalyst in the absence of further supply of hydrogen gas from the initiator.

7. The device according to claim 6, wherein the hydrogen gas restores activity of the catalyst.

8. The device according to claim 7, wherein the primary fuel is selected from the group consisting of isopropanol, butanol, methanol, ethanol, and combinations thereof.

9. The device according to claim 6, wherein the thermal conductor is a multifunctional device configured to adjust one or more functions selected from the group consisting of rate of fuel heating, rate of fuel vaporization, rate of fuel vapor reaching the catalyst and rate of heat output.

10. The device according to claim 6, wherein the initiator is a metal hydride capable of generating hydrogen gas upon contact with the primary fuel.

11. The device according to claim 9, wherein the thermal conductor may be repositioned or modified relative to the fuel container to adjust heat transport to the fuel, a rate of fuel vaporization, and/or a rate of fuel vapor reaching the catalyst, and/or a rate of heat output from the device.

12. The device according to claim 9, wherein the thermal conductor may be positioned within the liquid or gel fuel by a thermal-mechanical means or thermostatically controlled motor or solenoid to either insert a portion of the thermal conductor more deeply into the fuel or pull a portion of the thermal conductor out of, or less deeply into the fuel in order to regulate temperature.

13. The device according to claim 6, wherein pressure is applied to the fuel, which upon release, travels through a fuel line to an external chamber for chemical reaction with the initiator to produce hydrogen gas, fuel vapor and heat.

14. The device according to claim 6, further being comprised of a membrane or porous media positioned between the catalyst and fuel vapor, such that the membrane or porous media can restrict fuel flow, thereby governing or determining the heat output.

15. The device according to claim 6, further being comprised of an electric heater adjacent to or within the fuel container or fuel distribution system, such that the electric heater aids or creates vaporization of the fuel.

16. The device according to claim 15, wherein in order to vary a temperature output of the device, the electric heater is thermostatically controlled or temperature controlled based either directly upon a temperature of a portion of the device or based upon a temperature of an area or item being heated by the device.

17. The device according to claim 15, wherein in order to vary a heat output of the device, the electric heater is controlled via a voltage or current regulation means, or via a pulse width modulation.

18. The device according to claim 6, wherein the initiator comprises an external source of hydrogen gas.

19. The device according to claim 6, wherein the initiator is a metal hydride stored within a chemical container that is opened by one or more piercing means to release the stored metal hydride into the fuel for reaction.

20. The device according to claim 19, wherein the fuel is stored within a fuel container that is opened by one or more piercing means to allow release of the fuel for reaction with the initiator.

21. The device according to claim 19, wherein the one or more piercing means is driven by one or more compression springs, one or more pistons, or other piston-like means.

22. A device for transferring heat, the device being comprised of:

a fuel container;

a primary fuel comprising a liquid or gel alcohol in the fuel container;

a thermal conductor in thermal contact with the fuel;

a catalyst, wherein the catalyst is thermally connected to the thermal conductor and fluidly connected to air;

an initiator, wherein the provides a supply of hydrogen gas and is capable of initiating a controlled combustion of the primary fuel by:

(a) combusting the hydrogen gas with air on or near the catalyst; and (b) generating heat and vaporization of the primary fuel;

wherein the fuel container and thermal conductor are configured such that (i) heat generated by the initiator is transferred to the primary fuel and (ii) vaporized primary fuel is delivered to the catalyst; and wherein the heat and vaporized primary fuel thereby support an environment for sustained combustion of the primary fuel by the catalyst in the absence of further supply of hydrogen gas from the initiator wherein the heat and vaporized primary fuel thereby support an environment for sustained combustion of the primary fuel by the catalyst in the absence of further supply.

23. The device according to claim 22, the alcohol fuel is selected from the group consisting of isopropanol, butanol, methanol, ethanol, and combinations thereof.

24. The device according to claim 23, wherein the initiator is compressed hydrogen gas stored in a compressed hydrogen gas tank.

25. The device according to claim 24, wherein the initiator is a metal hydride capable of generating hydrogen gas within the alcohol fuel.

26. The device according to claim 25, wherein the metal hydride is contained within a frangible container.

27. The device according to claim 22, wherein the thermal conductor may be repositioned or modified relative to the fuel container to adjust heat transport to the fuel, a rate of fuel vaporization, and/or a rate of fuel vapor reaching the catalyst, and/or a rate of heat output from the device.

28. The device according to claim 22, wherein the thermal conductor may be positioned within the liquid or gel fuel by a thermal-mechanical means or thermostatically controlled motor or solenoid to either insert a portion of the thermal conductor more deeply into the fuel or pull a portion of the thermal conductor out of, or less deeply into the fuel in order to regulate temperature.

29. The device according to claim 22, further being comprised of an electric heater adjacent to or within the fuel container or fuel distribution system, such that the electric heater aids or creates vaporization of the fuel.

30. The device according to claim 22, further comprising one or more scents or animal/insect repellents in the fuel.

31. The device according to claim 29, wherein in order to vary a temperature output of the device, the electric heater is thermostatically controlled or temperature controlled based either directly upon a temperature of a portion of the device or based upon a temperature of an area or item being heated by the device.

* * * * *